(12) United States Patent
Rezac et al.

(10) Patent No.: US 12,280,863 B2
(45) Date of Patent: Apr. 22, 2025

(54) SYSTEMS AND METHODS FOR LOADING A WATERCRAFT ON A TRAILER

(71) Applicant: NAVICO, INC., Tulsa, OK (US)

(72) Inventors: Ryan R. Rezac, Tulsa, OK (US); Kristopher C. Snyder, Claremore, OK (US); Jeremiah D. Clark, Tulsa, OK (US)

(73) Assignee: Navico, Inc., Tulsa, OK (US)

(*) Notice: Subject to any disclaimer, the term of this patent is extended or adjusted under 35 U.S.C. 154(b) by 303 days.

(21) Appl. No.: 17/574,782

(22) Filed: Jan. 13, 2022

(65) Prior Publication Data

US 2023/0219678 A1    Jul. 13, 2023

(51) Int. Cl.
| | |
|---|---|
| *B63H 25/04* | (2006.01) |
| *B60P 3/10* | (2006.01) |
| *B63H 20/00* | (2006.01) |
| *G05D 1/00* | (2024.01) |

(52) U.S. Cl.
CPC ............ *B63H 25/04* (2013.01); *B60P 3/1058* (2013.01); *B63H 20/007* (2013.01); *G05D 1/0206* (2013.01); *B63H 2025/045* (2013.01)

(58) Field of Classification Search
None
See application file for complete search history.

(56) References Cited

U.S. PATENT DOCUMENTS

| | | | |
|---|---|---|---|
| 5,785,281 A | 7/1998 | Peter et al. | |
| 7,561,886 B1 | 7/2009 | Gonring et al. | |
| 8,924,054 B1 | 12/2014 | Arbuckle et al. | |
| 9,904,293 B1* | 2/2018 | Heap | G05D 1/12 |
| 10,126,748 B2 | 11/2018 | Akuzawa | |
| 10,150,551 B2 | 12/2018 | Steward et al. | |
| 10,191,490 B2 | 1/2019 | Akuzawa et al. | |
| 10,259,555 B2 | 4/2019 | Ward et al. | |
| 10,322,787 B2 | 6/2019 | Ward | |
| 10,324,468 B2 | 6/2019 | Arbuckle et al. | |
| 10,429,845 B2 | 10/2019 | Arbuckle et al. | |
| 10,745,096 B2 | 8/2020 | Clark | |
| 2016/0264220 A1* | 9/2016 | Laceky | B60P 3/1075 |
| 2016/0311511 A1 | 10/2016 | Clark | |
| 2018/0050772 A1* | 2/2018 | Koyano | B63H 25/04 |
| 2018/0297674 A1 | 10/2018 | Grace et al. | |
| 2019/0300138 A1 | 10/2019 | Akuzawa et al. | |
| 2019/0302773 A1 | 10/2019 | Akuzawa et al. | |
| 2019/0302774 A1 | 10/2019 | Akuzawa et al. | |
| 2019/0308713 A1 | 10/2019 | Akuzawa et al. | |
| 2019/0317504 A1 | 10/2019 | Akuzawa et al. | |
| 2020/0102009 A1* | 4/2020 | Owen | B62D 15/028 |

(Continued)

FOREIGN PATENT DOCUMENTS

EP    3 639 104 B1    10/2022

*Primary Examiner* — Aniss Chad
*Assistant Examiner* — Jennifer M Anda
(74) *Attorney, Agent, or Firm* — Nelson Mullins Riley & Scarborough LLP (57) ABSTRACT

Methods and systems described herein can assist a user when loading a watercraft onto a trailer (e.g., at a boat ramp). For example, position data generated by sensor(s) coupled to the watercraft and/or trailer can cause one or more propulsion devices associated with the watercraft to automatically (e.g., without user intervention) position the watercraft onto the trailer, for example, by controlling the power and/or thrust direction of the propulsion device(s).

17 Claims, 8 Drawing Sheets

(56) References Cited

U.S. PATENT DOCUMENTS

| | | |
|---|---|---|
| 2020/0247518 A1 | 8/2020 | Dannenberg et al. |
| 2020/0369351 A1 | 11/2020 | Behrendt et al. |
| 2020/0401143 A1 | 12/2020 | Johnson et al. |
| 2022/0234490 A1* | 7/2022 | Traub ........................ B63C 3/12 |
| 2022/0281569 A1* | 9/2022 | Traub ................... G05D 1/0206 |
| 2023/0042962 A1* | 2/2023 | Inoue ...................... G01S 19/14 |
| 2023/0103359 A1* | 4/2023 | Rivers .................. G05D 1/0044 |
| | | 701/2 |

* cited by examiner

SYSTEMS AND METHODS FOR LOADING A WATERCRAFT ON A TRAILER

FIELD OF THE INVENTION

Embodiments of the present invention relate generally to systems and methods of operating a watercraft and, more particularly, to systems and methods to assist loading a watercraft onto a trailer.

BACKGROUND OF THE INVENTION

Loading a boat onto a trailer can be a stressful experience even for experienced boaters, especially when the boat ramp is crowded with other boaters looking to launch and/or retrieve their boats. Significant damage can be done to a user's own boat and trailer (or others') without proper alignment and landing of the watercraft, which requires the user to account for various factors, such as boat traffic, pitch of the boat ramp, wind, tide, and/or current.

There remains a need for improved methods and systems for loading a watercraft onto a trailer.

BRIEF SUMMARY OF THE INVENTION

Described herein are implementations of various technologies for assisting a user of a watercraft to load a boat onto a trailer (e.g., for towing the watercraft over land).

In an example embodiment, a system associated with a watercraft having a propulsion device for propelling the watercraft along a body of water is provided, the system comprising at least one sensor configured to generate position data indicative of a location and orientation of the watercraft relative to a trailer upon which the watercraft is to be loaded. The system also comprises one or more processors and a memory including computer program code configured to, when executed, cause the one or more processors to receive the position data from the at least one sensor, and in response to receiving said position data, cause the at least one propulsion device to position the watercraft onto the trailer. For example, in certain aspects, the memory and computer program code may be configured to adjust at least one of a direction or power of propulsion so as to cause the at least one propulsion device to position the watercraft onto the trailer.

The position sensor(s) can be disposed at a variety of locations. For example, in certain aspects, the at least one sensor can be configured to be coupled to the watercraft. Additionally or alternatively, the at least one sensor can be configured to be coupled to the trailer, a tow vehicle, and/or a fixed location associated with the loading/unloading area (e.g., on or adjacent the boat ramp). In some related aspects, the at least one sensor can be configured to communicatively couple with a marine electronic device associated with the watercraft.

One or more sensors may be used to generate position data, and the one or more sensors may be disposed at a variety of locations. For example, in certain aspects in which the sensors are coupled to the trailer, the at least one sensor can comprise first, second, and third sensors, wherein the first sensor is configured to be disposed adjacent a bow stop of the trailer and the second and third sensors are configured to be disposed on fenders on opposed sides of the trailer.

In various aspects, the memory and computer program code can be further configured to, with the one or more processors, cause the propulsion device to maintain a position within a predetermined distance of a bow stop of the trailer.

In certain aspects, the memory and computer program code can be further configured to, with the one or more processors, receive an indication from a user to position the watercraft on the trailer. In some related aspects, the memory and computer program code can be further configured to, with the one or more processors, cause a marine electronic device associated with the watercraft to display a trailering training routine to a user of the marine electronic device.

One or more additional sensors may be utilized to assist trailering. For example, in some aspects, the system may further comprise a wind sensor configured to generate wind data, wherein the memory and computer program code are further configured to, with the one or more processors, determine a wind corrective adjustment to apply to the propulsion device. Additionally or alternatively, in certain aspects, a water current sensor may be provided and configured to generate water current data, and wherein the memory and computer program code are further configured to, with the one or more processors, determine a water current corrective adjustment to apply to the propulsion device.

Propulsion devices suitable for use in accordance with the present teachings can have a variety of configurations and can be used alone or in combination. By way of example, the propulsion device can comprise one of an inboard motor, an outboard motor, a trolling motor, or a thruster coupled to the watercraft.

Position sensors can also have a variety of configurations for indicating a relative position and/or orientation of the trailer and watercraft. By way of example, the at least one sensor comprises one of a visual, optical, radiofrequency, or radar sensor.

In various aspects, the memory and computer program code may be further configured to, with the one or more processors, alert a user that the trailer is incorrectly positioned for receiving the watercraft.

The present teachings also provide a non-transitory computer-readable medium having stored thereon a plurality of computer-executable instructions which, when executed by a computer, cause a computer to: receive an indication from a user to position a watercraft on a trailer, wherein the watercraft comprises at least one propulsion device for propelling the watercraft along a body of water; receive position data indicative of a location and orientation of the watercraft relative to a trailer from at least one sensor; and in response to receiving said position data, cause the at least one propulsion device to position the watercraft onto the trailer.

In various aspects, the computer-executable instructions can cause an adjustment to at least one of a direction or power of propulsion by the propulsion device.

Position data indicative of a location and orientation of the watercraft relative to a trailer can be received from a variety of sensors disposed at various locations. For example, in various aspects, the at least one sensor can be coupled to the trailer, and the at least one sensor can be wirelessly coupled with a marine electronic device associated with the watercraft.

In certain aspects, the computer-executable instructions can further cause the propulsion device to maintain the watercraft against a bow stop of the trailer.

Certain aspects of the non-transitory computer-readable medium described herein may further comprise computer-executable instructions that cause an electronic device associated with the watercraft to display a trailering training routine to the user.

In various aspects, the computer-executable instructions may further cause the generation of an alert to the user that the trailer is incorrectly positioned for receiving the watercraft.

In an example embodiment, a method for operating a propulsion device of a watercraft is provided, the method comprising receiving an indication from a user to position the watercraft on a trailer and causing one or more sensors to generate position data indicative of a location and orientation of the watercraft relative to the trailer. In response to receiving the position data, one or more processors in operable communication with the propulsion device can cause an adjustment to at least one of a direction or power of propulsion by the propulsion device to position the watercraft onto the trailer.

Additional example embodiments of the present invention include methods, systems, and computer program products associated with various embodiments described herein.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

In accordance with various aspects of the present teachings, the disclosed methods and systems can assist a user when loading a watercraft onto a trailer (e.g., at a boat ramp). In various aspects, the disclosed methods and systems utilize position data generated by sensor(s) coupled to the watercraft and/or trailer to cause one or more propulsion devices associated with the watercraft to automatically (e.g., without user intervention) position the watercraft onto the trailer, for example, by controlling the power and/or thrust direction of the propulsion device(s).

Figure 1:
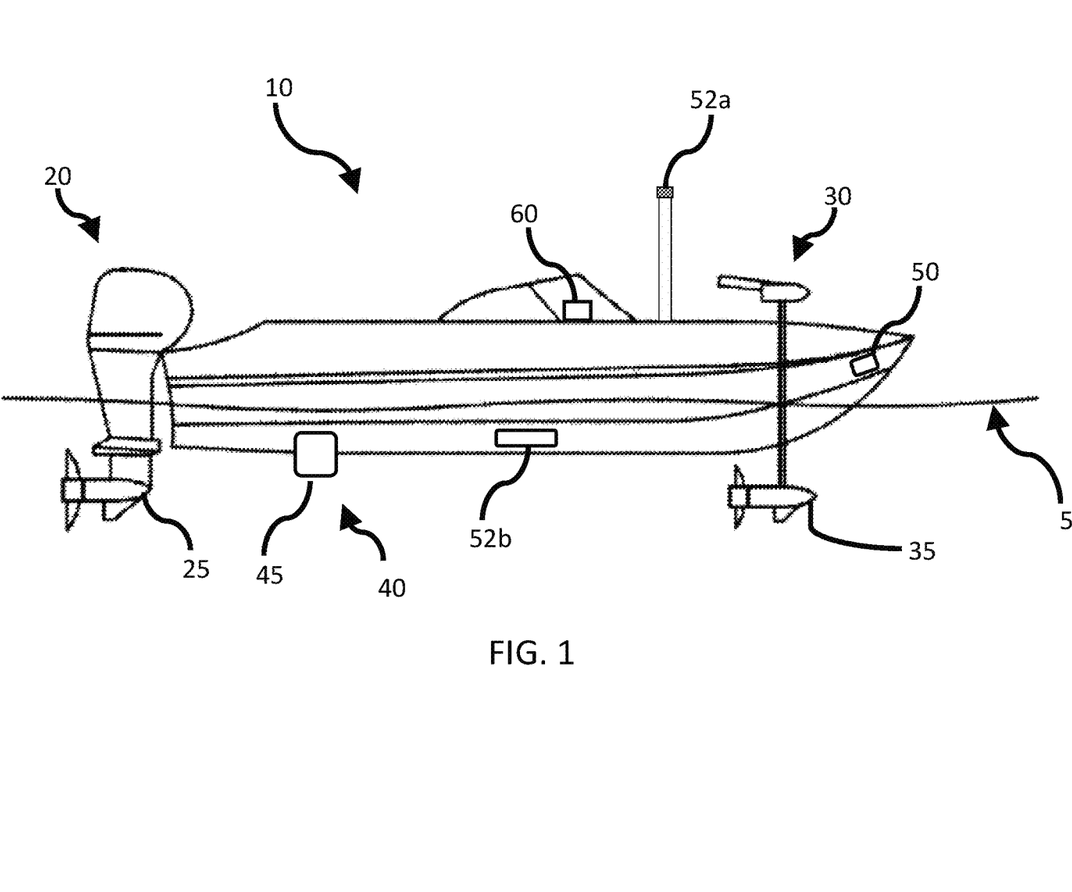
FIG. 1 illustrates an example watercraft including a sensor for indicating the relative position of the watercraft and a trailer in accordance with some embodiments discussed herein.

FIG. 1 illustrates an example marine vessel (e.g., watercraft 10) on a body of water 5. As shown in FIG. 1, the example watercraft 10 has an outboard motor assembly 20 attached to its stern, with a motor 25 submerged in the body of water 5. The watercraft 10 also has a trolling motor assembly 30 attached to its bow, with a trolling motor 35 submerged in the body of water 5. In various aspects, the outboard motor assembly 20 and/or the trolling motor assembly 30 can be used as a propulsion device to cause the watercraft 10 to travel along the surface of the water 5. While the depicted embodiment shows the outboard motor assembly 20 attached to the stern of the watercraft 10 and serving as a primary propulsion system, the present teachings contemplate that the outboard motor assembly 20 can serve as the sole propulsion system and/or serve as a secondary propulsion system and, if present, can be attached in any position on the watercraft 10. Similarly, while the depicted embodiment shows the trolling motor assembly 30 used as a secondary propulsion system, it will be appreciated that the trolling motor assembly 30 can serve as the sole propulsion system and/or serve as the primary propulsion system and, if present, can be attached in any position on the watercraft 10.

The watercraft may also include additional propulsion systems, such as additional propulsion assembly 40, that includes an additional propulsion motor 45. In some embodiments, such additional propulsion assemblies 40 may be attached to any part of the watercraft 10 and submerged in the water 5 to aid in directional propulsion. In some embodiments, such additional propulsion assemblies 40 may be attached to a shaft or other attachment device that may be controlled for directing the thrust generated by the additional propulsion assembly 40 (although the additional propulsion assembly 40 may itself control the direction of thrust). In some embodiments, the additional propulsion assembly 40 may be removably attached to the watercraft 10 and positionable as needed to enable desirable thrust on demand (e.g., to aid in automatic trailing, docking, or other marine activities). Indeed, it will be appreciated by those skilled in the art that any one or more propulsion devices presently known or hereafter developed may be utilized alone or in combination in accordance with the present teachings to assist with loading the watercraft 10 onto a trailer as otherwise discussed herein. By way of non-limiting example, the watercraft 10 may utilize one or more gas or electric motors that may serve as outboard motors, inboard motors, sterndrives, thrusters, jets, pods, trolling motors, or any other type of watercraft motor for propelling the watercraft 10 along the body of water 5.

Figure 2:
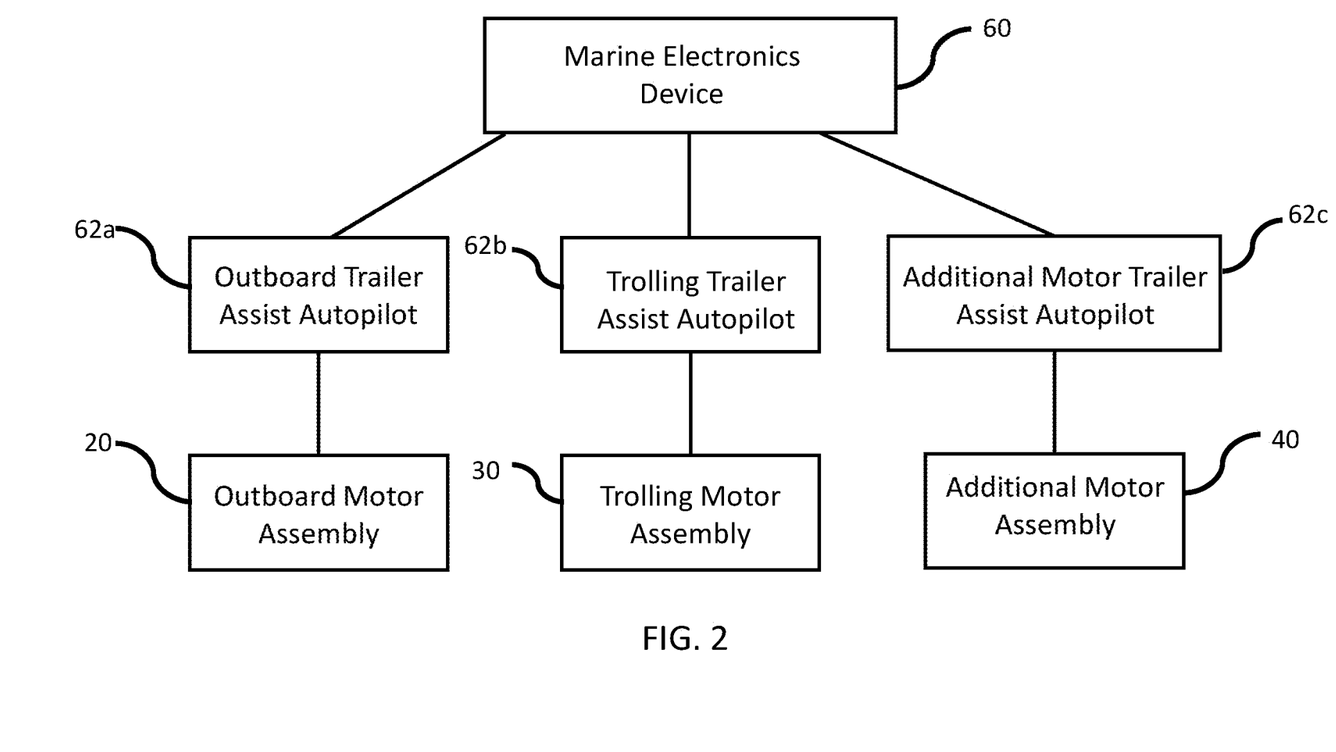
FIG. 2 illustrates a diagram of trailer assist autopilots in accordance with some embodiments discussed herein.

While the propulsion device(s) of watercraft 10 may, in some instances, be controlled by the user via hand control, foot control, or remote control as is known in the art, example embodiments of the present teachings provide that the operation of the outboard motor assembly 20, trolling motor assembly 30, and/or additional propulsion assemblies 40 may, in some instances, be electronically-controlled (e.g., under the direction of one or more processors) so as to assist a user when loading the watercraft 10 onto a trailer and/or to autonomously guiding the boat onto a trailer ("trailer assist functions"). As shown in FIG. 1, a marine electronics device 60, further described below with respect to FIG. 8, may be attached to or integrated in watercraft 10 and may be communicatively connected to electronic systems on the watercraft 10 for controlling various functions thereof. For example, with reference to FIG. 2, the marine electronics device 60 may be communicatively connected to an outboard trailer assist autopilot 62*a*, a trolling trailer assist autopilot 62*b*, and an additional motor trailer assist autopilot 62*c*, which respectively control the respective outboard motor assembly 20, trolling motor assembly 30, and/or additional propulsion assemblies 40 of FIG. 1. For example, the trailer assist autopilots 62*a*, 62*b*, and 62*c* may control the thrust (e.g., speed, power) and steering (e.g., direction) of the respective propulsion devices in response to control signals from the marine electronics device 60 so as to perform trailer assist functions based on the relative position and/or orientation of the watercraft 10 relative to a trailer.

With reference again to FIG. 1, the marine electronics device 60 may also be communicatively coupled to one or more sensors 50 that are configured to generate position data indicative of the watercraft's position and/or orientation relative to the trailer upon which the watercraft 10 is to be loaded. Although the example position sensor(s) 50 are depicted in FIG. 1 as being disposed near the bow of the watercraft 10, the sensor(s) 50 may be disposed in a variety of locations on the watercraft 10 or remote to the watercraft 10 to provide data regarding the relative positioning and/or orientation of the watercraft 10 and a trailer. For example, as discussed below with reference to FIG. 5, the one or more position sensors may additionally or alternatively be coupled to a trailer upon which the watercraft is to be loaded and in wireless communication with the marine electronics device 60 to perform trailer assist functions described herein. Likewise, in accordance with various aspects of the present teachings, the one or more position sensors may be additionally or alternatively coupled, for example, to a tow vehicle to which the trailer is hitched upon and/or at a watercraft loading/unloading area (e.g., a boat ramp). By way of example, in certain aspects, the one or more sensors may be disposed on the ramp itself and/or on a dock associated with the ramp to indicate the relative position of the watercraft 10 and trailer.

Position sensor(s) 50 may generate position data utilizing a variety of sensing techniques for indicating the relative position (e.g., distance) and/or orientation (angle) of the watercraft 10 and a trailer. By way of non-limiting example, the position sensor(s) 50 coupled to the watercraft 10 may utilize one or more imagers (e.g., cameras), proximity sensors (e.g., acoustic, RF, IR, optical, radar sensors), transmitters and/or receivers (e.g., transceivers). By way of example, in an instance in which the position sensor(s) 50 associated with the watercraft 10 comprise one or more imagers, image processing of the data generated by the image sensor can identify a distance and/or angle of the watercraft 10 relative to the trailer to assist in determining the speed and/or direction to be provided by the propulsion device(s) in order to properly align and guide the watercraft 10 onto the trailer. In various aspects, image processing may be performed (e.g., by one or more processors associated with marine electronics device 60) to identify portions of the trailer itself (e.g., a bow stop, rollers, rails). Alternatively, in some example aspects, trailer assist systems in accordance with the present teachings may utilize one or more markers (e.g., reflectors) and/or transmitters that are coupled to the trailer for detection by the one or more position sensors 50 associated with the watercraft 10 in order to generate position data. For example, in some aspects, the one or more position sensors 50 associated with the watercraft 10 could transmit acoustic, RF, IR, optical, or radar signals toward the trailer and detect signals reflected therefrom in order to indicate distance and/or angle to one or more portions of the trailer. Alternatively, in some aspects, one or more transmitters coupled to the trailer may be configured to generate signals that may be detected by the one or more position sensors 50 associated with the watercraft 10, thereby allowing the determination of the relative position of the watercraft 10 and the trailer. Similarly, in certain aspects, one or more markers (e.g., reflectors) and/or transmitters for detection by the one or more position sensors 50 can be disposed at or adjacent to the watercraft loading/unloading area such as on the boat ramp (e.g., on the incline, at the end of the ramp) or a structure associated therewith (e.g., on a dock that runs along the boat ramp, on pilings, on posts, etc.). Alternatively, in accordance with various aspects of the present teachings, the one or more markers (e.g., reflectors) and/or transmitters for detection by the one or more position sensors 50 can be coupled to a tow vehicle to which the trailer is hitched.

In some embodiments, the position sensor(s) 50 may be removably attachable so as to enable desirable positioning where most effective for achieving trailering. In this regard, different trailers and/or boats may be shaped differently and it may be desirable to place the position sensor(s) in a customized manner to enable automatic trailering. In some embodiments, the system may be configured to instruct the user where to place the position sensors 50 (e.g., on the watercraft, trailer, and/or vehicle pulling the trailer) to aid in effective trailering operations.

Figure 3:
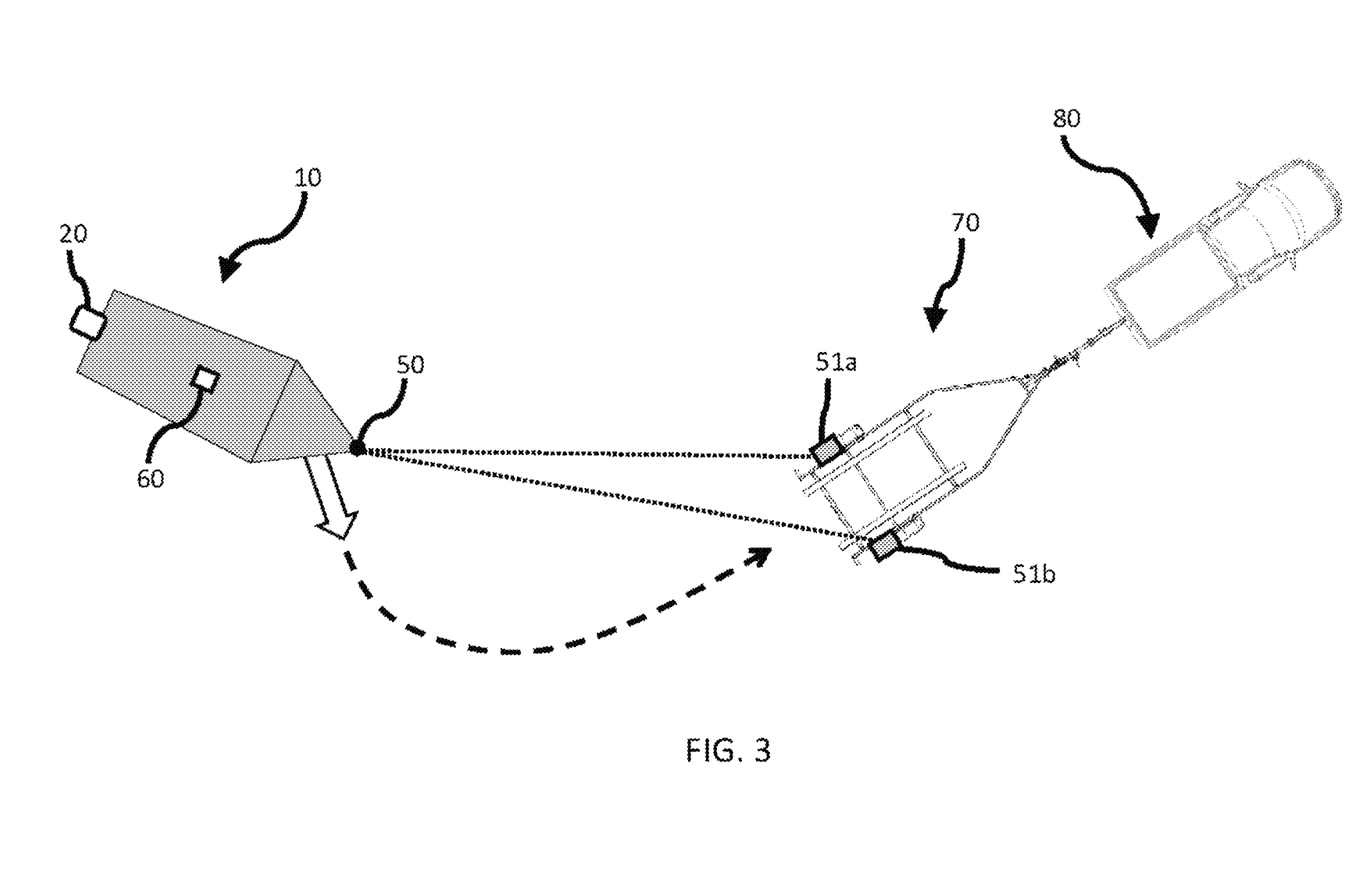
FIG. 3 schematically depicts aligning and guiding a watercraft onto a trailer in accordance with some embodiments discussed herein.

With reference now to FIG. 3, an example of use of the trailer assist function in accordance with various aspects of the preset teachings to align and guide the watercraft 10 onto the trailer 70 is schematically depicted. As shown, the trailer 70 is attached to a tow vehicle 80 that has backed the trailer 70 onto the boat ramp. Upon a user initiating the trailer assist function (e.g., via user selection on a display associated with marine electronics device 60), the position sensor(s) 50 may be activated to generate data indicative of the relative position of the watercraft 10 and the trailer 70. By way of non-limiting example, the position sensor(s) can generate data indicative of the distance to markers (e.g., reflectors 51*a,b*) that are coupled to the port and starboards sides of the trailer 70, respectively. In various aspects as discussed above, the trailer 70 itself may be identified by the position sensor(s) 50 or alternatively one or more transmitters could be coupled to a portion of the trailer for providing a transmission (e.g., IR transmission) that can be detected by the position sensor(s) 50. In any event, a distance and/or angle of the watercraft 10 relative to the markers 51*a,b* can be determined based on the signal(s) generated by position sensor(s) 50, for example, by a processor associated with the marine electronics device 60. For example, because the distance to starboard marker 51*b* is significantly longer than the distance to port marker 51*a*, the marine electronics device 60 may determine that alignment with the trailer 70 requires the watercraft to swing to starboard. For example, the marine electronics device 60 can cause the trolling motor assembly (or another or multiple motor assemblies) to provide thrust such that the watercraft 10 is propelled in the direction of the solid arrow in order to align the watercraft 10 with the trailer 70. Determination of the relative position of the watercraft 10 and trailer 70 can continue as the watercraft 10 is propelled through the water toward the trailer (e.g., along the dashed line) with the marine electronics device 60 being able to adjust the steering and/or thrust provided by outboard motor assembly 20 to align and guide the watercraft 10 to a proper loading position. For example, thrust of the outboard motor assembly 20 may be decreased as the watercraft 10 approaches the trailer 70 to avoid collisions therewith.

In addition to position sensor(s) 50, the watercraft 10 may also comprise one or more additional systems and sensors utilized in operating the watercraft 10. By way of non-limiting example, the watercraft 10 can include one or more of a sonar system, a Global Positioning System (GPS) device, such as a GPS receiver or a similar device such as GLONASS or global navigation satellite system (GNSS) receiver, a radar system, various navigation systems, and any other systems, such as lighting systems, wireless data communication devices, wireless audio communications devices, audio and video entertainment devices, weather and environmental sensor systems, and various vessel devices/features (e.g., doors, bilge pump, fuel tank, etc.), among other things, disposed onboard the watercraft 10. In various aspects, such systems may also be communicatively coupled to the marine electronics device 60 to allow for observation (e.g., via a display associated with the marine electronics device 60) and/or control of these systems. It will be appreciated by those skilled in the art that such other sensor systems of the watercraft 10 may assist during the performance of trailer assist functions in accordance with various aspects of the present teachings. By way of example, a depth sensor (e.g., sonar) associated with the watercraft 10 may generate data indicative of water depth to assist in determining control of the propulsion device(s), for example, to prevent the watercraft 10 from colliding with underwater obstructions and/or running aground during the trailering process. In some embodiments, various components may operate to aid in proper trailering, such as providing automatic trimming of one or motors as the watercraft undergoes the trailering process.

Figure 4:
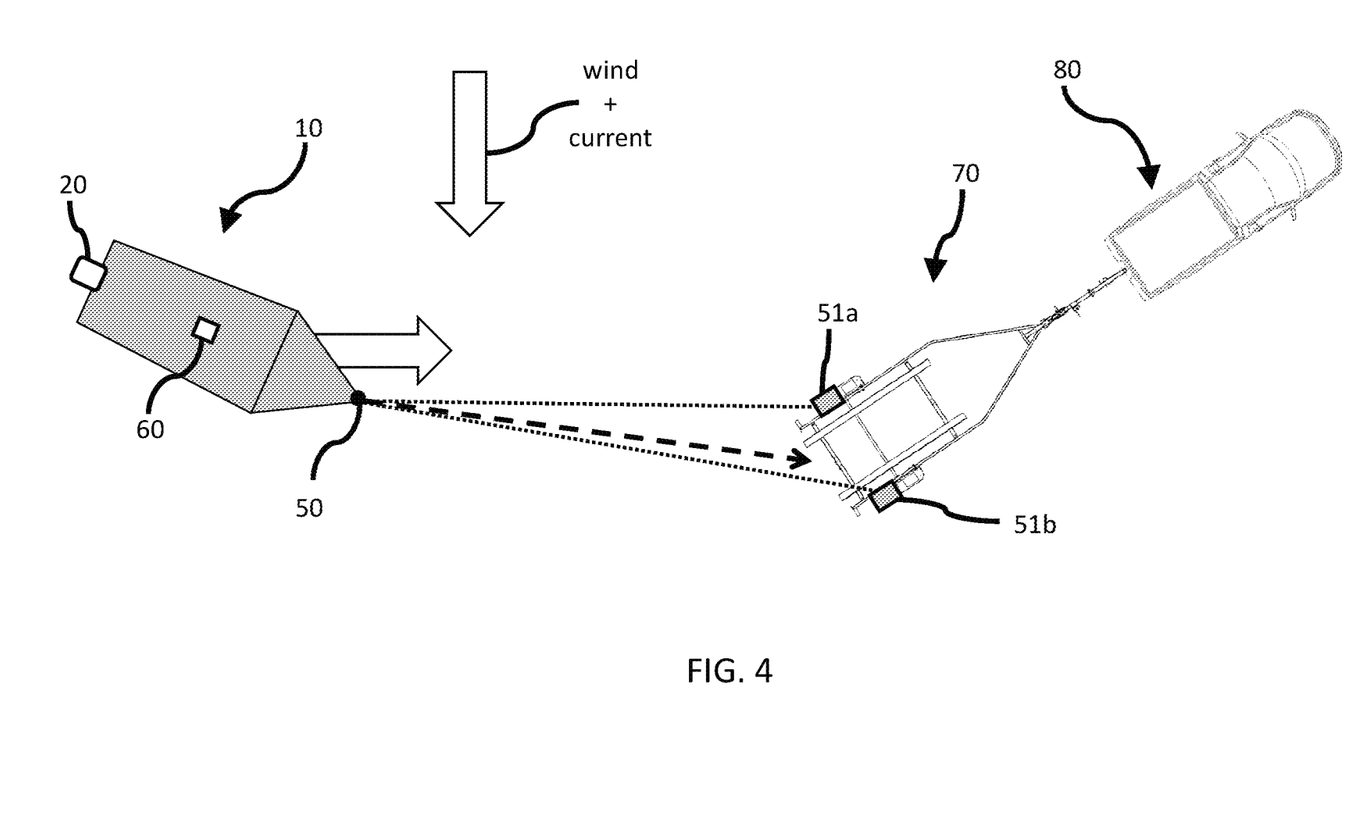
FIG. 4 schematically depicts aligning and guiding a watercraft onto a trailer in accordance with some embodiments discussed herein.

In some example embodiments, various sensor systems of the watercraft 10 utilized to provide data with respect to operation thereof may also be utilized during the performance of trailer assist functions in accordance with the present teachings. For example, as shown in FIG. 1, data generated by a wind sensor 52a that is indicative of the speed and/or direction of the wind may be utilized by the marine electronics device 60 to adjust the command signals provided to the propulsion device(s) (e.g., outboard motor assembly 20) to compensate for the effect of the wind while guiding the watercraft 10 onto the trailer. Likewise, data generated by a water current sensor 52b associated with the watercraft 10 may be utilized by the marine electronics device 60 to adjust the speed and/or direction of the propulsion device(s) to account for the detected water current. The schematic of FIG. 4, for example, is similar to that of FIG. 3 but differs in that a significant wind and water current are present during trailering. Though the watercraft 10 depicted in FIGS. 3 and 4 have the same initial relative position and orientation with respect to the trailer 70 upon initiation of the trailer assist function, the path dictated by the marine electronics device 60 in the situation of FIG. 4 differs significantly from that of FIG. 3 to compensate for the increased wind and current. For example, as indicated by the large solid arrow in FIG. 4, the steering motor assembly 20 can be controlled to cause the trolling motor assembly to provide increased thrust and at a different angle such that the watercraft 10 generally traverses along the straighter line with the watercraft 10 rotating into alignment due to the effects of the wind and current. In accordance with various aspects of the present teachings, the path can continue to be adjusted during the trailering routine, for example, due to any relative movement of the watercraft 10 and trailer 70.

Figure 5:
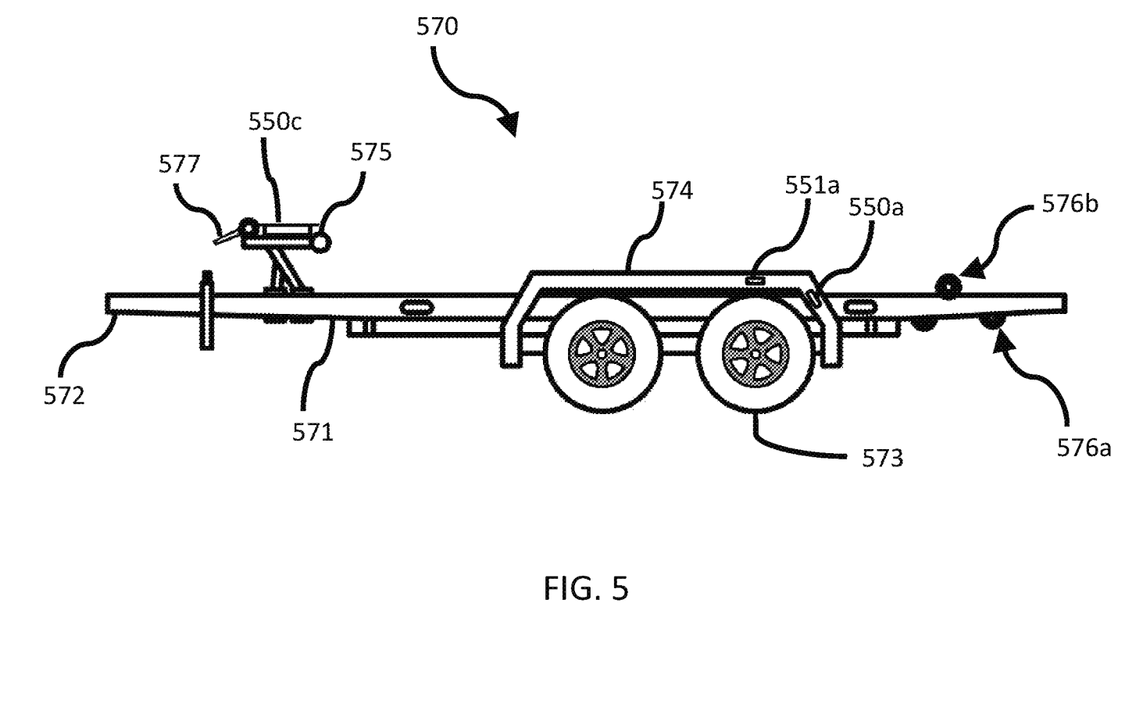
FIG. 5 illustrates an example trailer including at least one sensor for indicating the relative position of the trailer and a watercraft in accordance with some embodiments discussed herein.

FIG. 5 depicts an example trailer 570 upon which the watercraft 10 of FIG. 1 may be loaded to transport the watercraft 10 over land. As shown in FIG. 5, the trailer 570 generally includes a frame 571 having a tongue 572 on its front end that is configured to couple to the hitch of a tow vehicle (not shown in FIG. 5). A plurality of axle-mounted wheels 573 allow the trailer 570 to be towed behind the tow vehicle. In various aspects, the trailer 570 may include fenders 574 coupled to the frame 571 and extending over the wheels 573, for example, to prevent mud and/or debris kicked up from the wheels 573 from damaging the underside of a watercraft loaded onto the trailer 570 during transport. As shown in FIG. 5, the fenders 574 may also include one or more markers 551a, that may be used in conjunction with the position sensor(s) 50 of the watercraft 10 as discussed above with reference to FIGS. 3 and 4. Additionally, in certain aspects, the front end of the trailer 570 may include a bow stop 575, against which the bow of the watercraft may rest when loaded onto the trailer. The bow stop 575 may be one or more rollers, pads, or V-shaped guards, for example, that engage the bow of the watercraft when the watercraft is positioned on the trailer 570.

Watercraft may be positioned on a trailer in accordance with the present teachings in a variety of manners, for example, on a plurality of rollers or pads (e.g., bunks) over which the hull of the watercraft rolls or slides when loaded onto the trailer. As shown in the example of FIG. 5, the example trailer 570 includes a plurality of sets of keel rollers 66a that movably engage the centerline of the watercraft hull (i.e., the keel) to allow for the watercraft to smoothly roll onto or off the trailer 570 with limited drag. In addition, the depicted trailer 570 includes a plurality of lateral rollers 576b, which are spaced so as to be disposed against the hull on opposite sides of the centerline to provide additional lateral stability. The rollers 576a,b depicted in FIG. 5 are just one example configuration of hull supports suitable for use in accordance with the present teachings. For example, though rollers 576a,b are configured to receive a keeled watercraft, a person skilled in the art will appreciate that trailers in accordance with various aspects of the present teachings may be configured to transport a flat-bottomed boat or a pontoon boat over appropriately positioned rollers or pads (e.g., bunks).

As shown in FIG. 5, the front end of trailer 570 additionally includes a winch 577 having a safety strap or chain (not shown), for example, that can be connected to the watercraft to pull the watercraft to the bow stop 575 when loading and/or to help secure the watercraft to the trailer 570. The winch 577 may be manually or electrically operated. In some embodiments, the trailer assist function may include operation and/or control of the winch 577.

As discussed above, systems and methods in accordance with the present teachings may comprise a marine electronics device (e.g., device 60 of FIG. 1) that is configured to receive position data from one or more sensors associated with the watercraft and/or trailer upon which the watercraft is to be loaded. While in the example systems discussed above with reference to FIGS. 1-4 the position sensors (e.g., sensor(s) 50)) are disposed aboard the watercraft and are wired or wirelessly connected to the marine electronics device to provide position data thereto, the trailer 570 of FIG. 5 includes a plurality of position sensors 550 configured to generate position data during trailer assist functions. In particular, in the example depicted in FIG. 5, the trailer 570 includes a sensor 550a coupled to each fender 564 (only one sensor 550a is visible in the view of FIG. 5) and one sensor 550c adjacent to the bow stop 575. However, it will be appreciated in light of the present teachings that the location of sensors 550a-c are not so limited and may be disposed at a variety of locations of the trailer 570. By way of example, sensors may be associated with one or more cross-members or pads of trailer 570 and/or the rollers 576a,b for detecting alignment therewith and/or a pressure thereon (e.g., uneven pressure may indicate misalignment). The sensors 550a-c are configured to generate (and wirelessly communicate) the position data to a marine electronics device (not shown) associated with the watercraft to be loaded. As above, position sensors 550 may generate position data utilizing a variety of sensing techniques for indicating the position (e.g., distance) and/or orientation (angle) of the watercraft relative to the trailer 570 including through the use of imagers, proximity sensors, transmitters and/or receivers (e.g., transceivers), all by way of non-limiting example. In an instance in which the position sensors 550a-c associated with the trailer 570 comprises one or more imagers, for example, image processing of the data generated by the image sensor can indicate to the imaged watercraft itself or to one or markers (e.g., reflectors) disposed on the watercraft. Alternatively, in some aspects, the position sensors 550a-c may be configured to receive signals transmitted by the watercraft, the characteristics of which may be used to indicate position data. In some aspects, the sensor 550c may be configured to generate a signal received by the marine electronic device that indicates when the bow of the watercraft is within a predetermined distance of the bow stop 575. In this regard, the trailer assist function may operate various motor assemblies (including the winch) in accordance with position data to bring the bow of the watercraft to a certain predetermined distance of the bow stop 575 (e.g., 1 inch, 6 inches, 1 foot, 2 feet, 3 feet or less, 2 feet or less, 1 foot or less, etc.).

In some embodiments, such as further described herein, various operations (e.g., direction and thrust control of the motors) may be displayed to the user to show how the trailer assist function is working (e.g., on a display of a marine electronic device of the watercraft). In some embodiments, the autopilot may not be performed as part of the trailer assist function and, instead, the instructions can be provided to the user for execution. Depending on how the user actually operates that motor assemblies (or various external factors), the trailer assist function may continuously update the instructions provided to the user, all to achieve effective and safe trailering of the watercraft. In accordance with various aspects of the present teachings, the trailer assist function may be at least partially based on machine learning. By way of example, operation of the trailer assist function may be modified, based on supervised or unsupervised machine learning, by collecting data during one or more attempts at trailering so as to adjust to a particular user or watercraft response during previous trailering attempts to continuously improve operation of the trailer assist function. The machine learning may include one or more of regression learning, classification learning, clustering, or the like, all by way of non-limiting example.

In some embodiments, additional steps or operations may be controlled and/or instructed by the trailer assist function. For example, when to connect the winch, if the vehicle needs to be moved (e.g., backed further down the ramp, positioned at a different angle, etc.), among other things. Depending on capabilities of the system, the trailer assist function may include control of corresponding components (e.g., back up the vehicle, operate the winch, etc.).

In some embodiments, the trailer assist function may include preparation instructions, such as where to place any bumpers, where to place any additional propulsion assemblies 40, where to place any position sensor(s) 50, etc. Such instructions could be provided to the user to aid in completion of the trailer assist function.

While the described embodiments are focused on trailering a watercraft, various embodiments described herein are applicable and contemplated for use with other watercraft placement scenarios, such as docking of the watercraft (e.g., to a dock, another watercraft, etc.). In such examples, the position sensors may sense the position data of the watercraft relative to the dock, other watercraft, or other object and similar assist functionality may be utilized (e.g., accounting for environmental factors and operating various motor assemblies as needed).

Example Flowchart(s) and Operations

Figure 6:
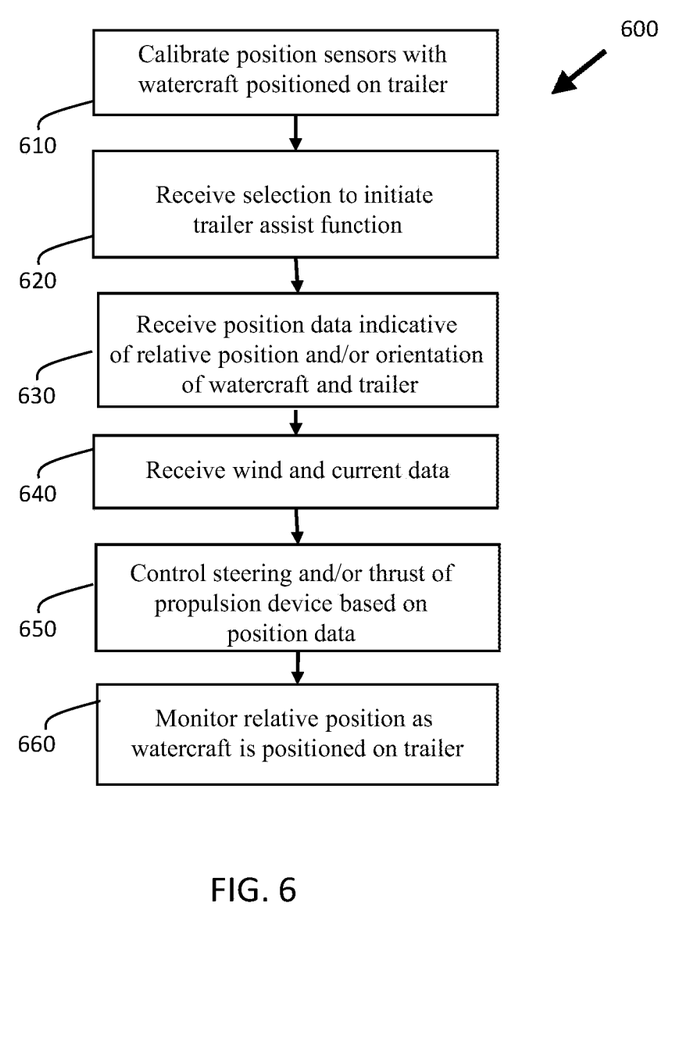
FIG. 6 is a flow diagram of a method for assisting a user to load a watercraft onto a trailer, in accordance with some embodiments discussed herein.
Figure 7:
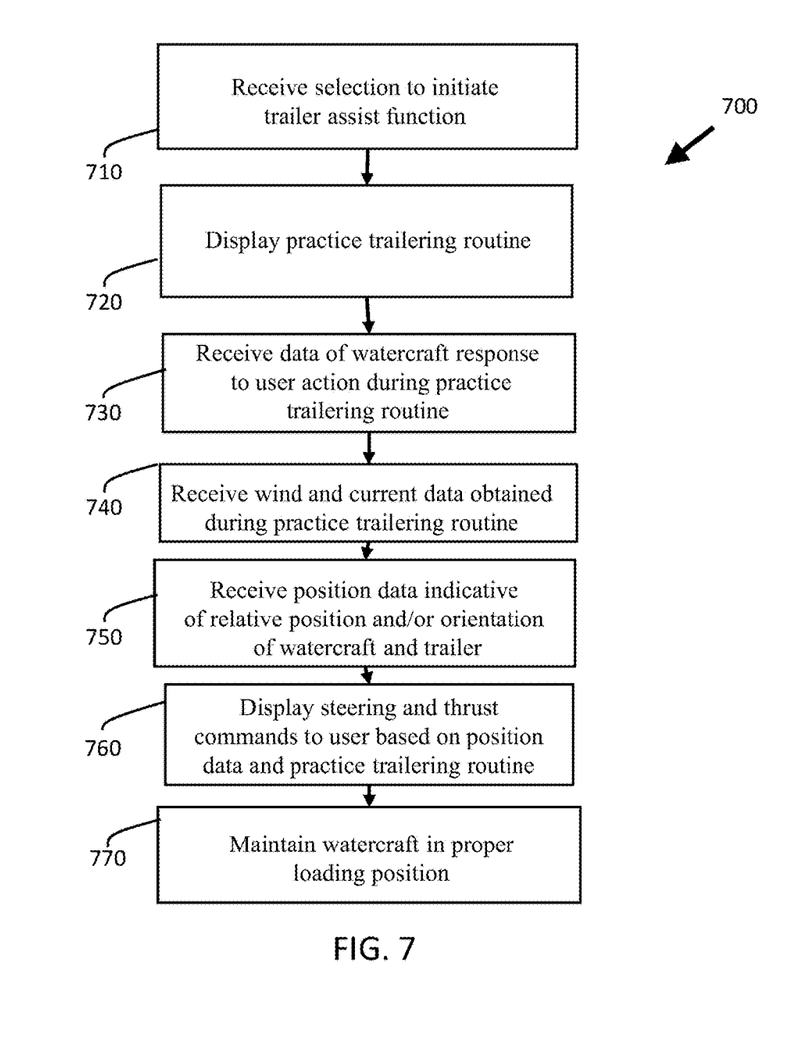
FIG. 7 is a flow diagram of another method for assisting a user to load a watercraft onto a trailer, in accordance with some embodiments discussed herein.

Some embodiments of the present invention provide methods, apparatus, and computer program products related to various embodiments described herein. Various examples of the operations performed in accordance with embodiments of the present invention will now be provided with reference to FIGS. 6 and 7. FIGS. 6 and 7 present flowcharts with example method(s) of performing trailer assist functions according to various embodiments described herein. These methods may be performed by a wide variety of components, including, but not limited to, one or more processors, one or more microprocessors, and one or more controllers. In some embodiments, a marine electronic device 860 (FIG. 8) may comprise one or more processors that perform the functions shown in FIGS. 6 and 7. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a watercraft, server, etc.

FIG. 6 is a flow diagram of a method 600 for autonomously performing trailer assist functions in accordance with implementations of various techniques described herein. In one implementation, method 600 may be performed by any computer system, including a marine electronics device 860 like that discussed below with reference to FIG. 8. It should be understood that while method 600 indicates a particular order of execution of operations, in some implementations, certain portions of the operations might be executed in a different order, or on different systems. Further, in some implementations, additional operations or steps may be added to the method 600. Likewise, some operations or steps may be omitted.

At block 610, position sensors disposed on the watercraft, trailer, tow vehicle, and/or boat ramp may be calibrated, for example, to identify ideal trailer positioning of the watercraft during towing. Such calibration can occur once, for example, upon trailer assist system installation, whenever the watercraft and/or trailer is adjusted (e.g., a new boat is obtained), or just prior to launch. In various aspects, the calibration may be adjusted due to machine learning, for example, based on previous occurrences of launching/retrieving the watercraft in the continuous improvement of the trailer assist functions described herein. In some aspects, systems in accordance with the present teachings may prompt the user to recalibrate the trailer assist function. Thereafter, the watercraft can be launched from the trailer for a day on the water.

Upon the watercraft returning to the boat ramp and an operator backing the trailer into a loading position on the boat ramp, a selection may be received to initiate the trailer assist function at block 620. By way of example, the selection may be received at a display associated with the marine electronic device 860 or the like (e.g., wired or wirelessly connected). Alternatively, in some aspects, a selection may be entered via a remote control or via a display interface executed on a user device (e.g., a tablet computer, smart phone, or the like) in communication with the marine electronic device 860. In some embodiments, sensing of a proximity of the watercraft to the trailer may initiate the trailer assist function and/or provide the option of the trailer assist function to the user for selection.

At block 630, position data indicative of the position of the watercraft relative to the trailer may be received from the one or more position sensors disposed on the watercraft and/or the trailer. For example, a transmitter on one of the trailer and the watercraft can be activated and the signals generated thereby detected by the position sensor.

In some aspects, data regarding environmental factors affecting the loading of the watercraft onto the trailer can also be received in block 640. By way of example, wind or water current measurements may be received.

Based on the position data received in block 630, instructions may be sent to one or more trailer assist autopilots instructing the autopilots to move the watercraft in the desired direction toward the trailer in block 650. The instructions may also include a wind and/or water current corrective adjustment based on data regarding environmental factors received in block 640, if any. The instructions may comprise messages, sets of instructions, commands, configurations, sets of coordinates, headings, or any other input for controlling a directional thrust of the watercraft's one or more propulsion devices to provide for alignment and autonomous guidance onto the trailer. In some aspects, for example, in instances where it is determined that the trailer is improperly positioned (e.g., too deep or shallow, poorly aligned) such that the watercraft cannot be properly positioned with respect to the trailer, an alert may be generated (e.g., on a display associated with the marine electronic device 860 or a user device) to notify the user prior to initiating movement of the watercraft toward the trailer.

At block 650, the relative position of the watercraft (and any environmental factors) may be monitored and the propulsion device(s) adjusted as the watercraft is guided onto the trailer until proper positioning is achieved. At this point, the user may attach a safety strap to secure the watercraft to the trailer. In some aspects, instructions may be sent to one or more trailer assist autopilots to maintain the watercraft in a fixed location (e.g., with the watercraft disposed within a predetermined distance of the trailer bow stop) during the securing process, for example, until the trailer assist function is deactivated by the user.

The example method 600 described above for aligning and guiding the watercraft into its proper loading position with respect to the trailer may be performed autonomously (e.g., without user intervention) after receiving a command as in block 610 to initiate the trailer assist function. However, methods in accordance with various aspects of the present teachings may alternatively provide trailering assistance to the user, for example, by providing recommended actions to be performed under the direction of the user to properly trailer the watercraft based on position data received from the one or more sensors. For example, FIG. 7 is a flow diagram of another method 700 for performing trailer assist functions in accordance with implementations of various techniques described herein. In one implementation, method 700 may be performed by any computer system, including a marine electronics device 860 described below with reference to FIG. 8. It should be understood that while method 700 indicates a particular order of execution of operations, in some implementations, certain portions of the operations might be executed in a different order, or on different systems. Further, in some implementations, additional operations or steps may be added to the method 700. Likewise, some operations or steps may be omitted.

A user desiring trailering assist functions while maintaining at least partial control of the throttle or steering may initiate such functions by selecting them on a display associated with the marine electronic device 860, via a remote control, or via a display interface executed on a user device (e.g., a tablet computer, smart phone, or the like) in communication with the marine electronic device 860. As shown in FIG. 7, the selection is received at block 710.

In some aspects, the selection in block 710 may preferably be entered as the watercraft is in open water (e.g., in the harbor but away from obstructions) such that a practice trailering routine may be initiated. By way of example, in block 720, a user may be given a series of throttle and steering commands to perform such as aligning the watercraft in the direction of trailering, performing a series of turns, increasing and decreasing the throttle, etc. As the user is performing the various commands, data regarding the watercraft's response to user inputs and data regarding the environmental factors (e.g., wind or water current measurements) affecting the watercraft's operation may be obtained in block 730 and 740.

Upon the user completing the training routine and being ready to load the boat onto the trailer, position data indicative of the position of the watercraft relative to the trailer may be received from the one or more position sensors disposed on the watercraft and/or the trailer at block 750. For example, a transmitter on one of the trailer and the watercraft can be activated and the signals generated thereby detected by the position sensor.

In block 760, throttle and steering commands may then be displayed for the user to perform based on position data received in block 750 and data regarding the watercraft's response to user inputs and the environmental factors determined in blocks 730 and 740. For example, if a user tended to excessively increase the throttle during the practice routine in step 730 and/or over-compensated for wind or water current in block 740, the throttle and steering commands provided in block 760 may adjust the instructions displayed to the user to account for these differences until the watercraft is properly positioned relative to the trailer. In some embodiments, the trailer assist function may cause limits to be placed on throttle commands that can be provided by the user, such as in response to the situation (e.g., proximity of the watercraft to the trailer or another watercraft, dock, person, etc.) and/or in response to appreciating the tendencies of the user (e.g., if the user tends to overshoot, etc.).

In block 770, instructions may be sent to one or more trailer assist autopilots to maintain the watercraft in a fixed location so that the user may attach a safety strap to secure the watercraft to the trailer prior to deactivating the trailer assist function.

Example System Architecture

Figure 8:
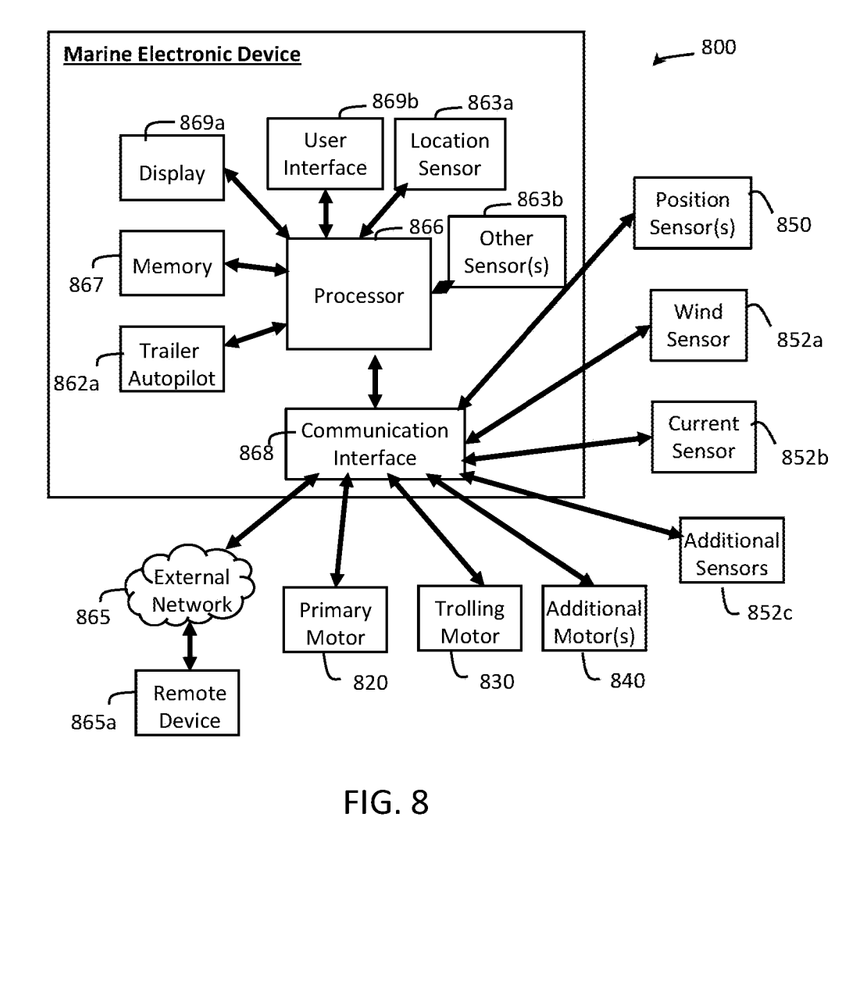
FIG. 8 is a block diagram illustrating a trailer assist system in accordance with some embodiments discussed herein.

FIG. 8 illustrates a block diagram of an example system 800 according to various embodiments of the present invention described herein. The illustrated system 800 includes a marine electronic device 860. The system 800 may comprise numerous marine devices. As shown in FIG. 8, one or more position sensors 850 may be provided. A primary motor assembly 820, a trolling motor assembly 830, additional motor assemblies 840, a wind sensor 852*a*, a water current sensor 852*b*, and additional sensors/devices 852*c* may also be provided as marine devices, but other marine devices may be provided as well. One or more marine devices may be implemented on the marine electronic device 860. For example, a primary motor trailer assist autopilot 862*a*, a location sensor 863*a*, and other sensors 863*b* may be provided within the marine electronic device 860. These marine devices can be integrated within the marine electronic device 860, integrated on a watercraft at another location and connected to the marine electronic device 860, and/or the marine devices may be implemented at a remote device 865 in some embodiments. The system 800 may include any number of different systems, modules, or components; each of which may comprise any device or means embodied in either hardware, software, or a combination of hardware and software configured to perform one or more corresponding functions described herein.

The marine electronic device 860 may include at least one processor 866, a memory 867, a communication interface 868, a display 869*a*, and a user interface 869*b*. One or more of the components of the marine electronic device 860 may be located within a housing or could be separated into multiple different housings (e.g., be remotely located).

The processor(s) 866 may be any means configured to execute various programmed operations or instructions stored in a memory device (e.g., memory 867) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 866 as described herein. For example, the at least one processor 866 may be configured to analyze position data received from the position sensor(s) 850 and determine thrust and steering commands to cause the operation of the primary motor 820.

In some embodiments, the at least one processor 866 may be further configured to implement signal processing. In some embodiments, the at least one processor 866 may be configured to perform enhancement features to improve the display characteristics of data or images, collect or process additional data, such as time, temperature, GPS information, waypoint designations, or others, or may filter extraneous data to better analyze the collected data. The at least one processor 866 may further implement notices and alarms, such as those determined or adjusted by a user, to reflect proximity of other objects (e.g., represented in sonar data), to reflect proximity of other vehicles (e.g. watercraft), improper trailer positioning, approaching storms, etc.

In an example embodiment, the memory 867 may include one or more non-transitory storage or memory devices such as, for example, volatile and/or non-volatile memory that may be either fixed or removable. The memory 867 may be configured to store instructions, computer program code, sonar data, and additional data such as radar data, chart data, location/position data in a non-transitory computer readable medium for use, such as by the at least one processor 866 for enabling the marine electronic device 860 to carry out various functions in accordance with example embodiments of the present invention. For example, the memory 867 could be configured to buffer input data for processing by the at least one processor 866. Additionally or alternatively, the memory 867 could be configured to store instructions for execution by the at least one processor 866.

The communication interface 868 may be configured to enable communication to external systems (e.g. an external network 865). In this manner, the marine electronic device 860 may retrieve stored data from a remote device 865*a* via the external network 865 in addition to or as an alternative to the onboard memory 867. Additionally or alternatively, the marine electronic device 860 may transmit or receive data, such as position data to or from position sensor(s) 850. In some embodiments, the marine electronic device 860 may also be configured to communicate with other devices or systems (such as through the external network 865 or through other communication networks, such as described herein). For example, the marine electronic device 860 may communicate with a propulsion system of the watercraft (e.g., for autopilot control); a remote device (e.g., a user's mobile device, a handheld remote, etc.); or another system. Using the external network 865, the marine electronic device may communicate with and send and receive data with external sources such as a cloud, server, etc. The marine electronic device 860 may send and receive various types of data. For example, the system may receive weather data, data from other fish locator applications, alert data, among others. However, this data is not required to be communicated using external network 865, and the data may instead be communicated using other approaches, such as through a physical or wireless connection via the communications interface 868.

The communications interface 868 of the marine electronic device 860 may also include one or more communications modules configured to communicate with one another in any of a number of different manners including, for example, via a network. In this regard, the communications interface 868 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sensors) may be included in the system 800.

The location sensor 863*a* may be configured to determine the current position and/or location of the marine electronic device 860 (and/or its associated watercraft). For example, the location sensor 863*a* may comprise a GPS, bottom contour, inertial navigation system, such as machined electromagnetic sensor (MEMS), a ring laser gyroscope, or other location detection system. Alternatively or in addition to determining the location of the marine electronic device 860 or a watercraft associated therewith, the location sensor 863*a* may also be configured to determine the position and/or orientation of an object outside of the watercraft.

The display 869*a* (e.g. one or more screens) may be configured to present images and may include or otherwise be in communication with a user interface 869*b* configured to receive input from a user. The display 869*a* may be, for example, a conventional LCD (liquid crystal display), a touch screen display, mobile device, or any other suitable display known in the art upon which images may be displayed.

In some embodiments, the display 869*a* may present one or more sets of data (or images generated from the one or more sets of data). Such data includes chart data, radar data, sonar data, weather data, location data, position data, orientation data, sonar data, or any other type of information relevant to the watercraft. Position data may be received from one or more position sensors 850 or from position sensors positioned at other locations, such as remote from the watercraft (e.g., on a trailer). Additional data may be received from marine devices such as a radar, a primary motor 820 or an associated sensor, a trolling motor 830 or an associated sensor, a trailer assist autopilot 862a, a location sensor 863a, other sensors 863b, a remote device 865a, onboard memory 867 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 869b may include, for example, a keyboard, keypad, function keys, mouse, scrolling device, input/output ports, touch screen, or any other mechanism by which a user may interface with the system.

Although the display 869a of FIG. 8 is shown as being directly connected to the at least one processor 866 and within the marine electronic device 860, the display 869a could alternatively be remote from the at least one processor 866 and/or marine electronic device 860. Likewise, in some embodiments, the location sensor 863a and/or user interface 869b could be remote from the marine electronic device 860.

The marine electronic device 860 may include one or more other sensors/devices 863b, such as configured to measure or sense various other conditions. The other sensors/devices 863b may include, for example, an air temperature sensor, a water temperature sensor, a water current sensor, a light sensor, a wind sensor, a speed sensor, or the like.

The position sensor(s) 850 illustrated in FIG. 8 may include one or more sensors for indicating the relative position and/or orientation of a watercraft relative to a trailer, such as described herein. In some embodiments, additional separate position sensors (arranged to operate alone, in an array, or otherwise) may be included. The position sensor(s) 850 may also include a signal processor or other processor (although not shown) configured to perform various signal processing. In some embodiments, the processor (e.g., at least one processor 866 in the marine electronic device 860, a controller (or processor portion) in the position sensor(s) 850, or a remote controller or combinations thereof) may be configured to process (e.g., analyze, filter) position data and/or selectively position sensor(s) 850. For example, various processing devices (e.g., an A-to-D converter) may be utilized in controlling position data and/or transmission of position data.

Depending on the desired position data, the position sensor(s) 850 may be configured differently. For example, some position sensor(s) 850 may utilize one or more imagers (e.g., cameras), proximity sensors (e.g., acoustic, RF, IR, optical, radar sensors), transmitters and/or receivers (e.g., transceivers). As an example, a position sensor may be a time-of-flight sensor that can be used to determine distance to an object.

The position sensor(s) 850 may also include one or more other systems, such as various sensor(s) 852c. For example, the position sensor(s) 850 may include an orientation sensor, such as gyroscope or other orientation sensor (e.g., accelerometer, MEMS, direction, etc.) that can be configured to determine the relative orientation and/or direction of the sensing element—such as with respect to the watercraft. In some embodiments, additionally or alternatively, other types of sensor(s) are contemplated, such as, for example, a water temperature sensor, a water current sensor 852b, a light sensor, a wind sensor 852a, a speed sensor, or the like.

The components presented in FIG. 8 may be rearranged to alter the connections between components. For example, in some embodiments, a marine device outside of the marine electronic device 860, such as the wind sensor 852a and/or water current sensor 852b, may be directly connected to the at least one processor 866 rather than being connected to the communication interface 868. Additionally, sensors and devices implemented within the marine electronic device 860 may be directly connected to the communications interface in some embodiments rather than being directly connected to the at least one processor 866.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system associated with a watercraft having at least one propulsion device for propelling the watercraft along a body of water, the system comprising:
   at least one sensor configured to generate position data indicative of a location and orientation of the watercraft relative to a trailer upon which the watercraft is to be loaded;
   one or more processors; and
   a memory including computer program code configured to, when executed, cause the one or more processors to:
   receive an indication from a user to position the watercraft on the trailer;
   receive the position data from the at least one sensor;
   employ a machine learning module configured to:
      record data from multiple attempts of positioning the watercraft on the trailer; and
      analyze the recorded data to identify patterns in user behavior and watercraft response;
   determine, based on the position data and the machine learning module, instructions to provide to the user to position the watercraft onto the trailer, wherein the machine learning module continuously updates the instructions based on the analyzed data;
   cause display of the instructions to the user so as to aid the user to position the watercraft onto the trailer.

2. The system of claim 1, wherein the memory and computer program code are configured to provide preparation instructions to the user indicating where to position at least one of the at least one sensor on the watercraft.

3. The system of claim 1, wherein the at least one sensor is configured to be coupled to the trailer.

4. The system of claim 3, wherein the at least one sensor is configured to communicatively couple with a marine electronic device associated with the watercraft.

5. The system of claim 3, wherein the at least one sensor comprises a first sensor, a second sensor, and a third sensor, wherein the first sensor is configured to be disposed adjacent a bow stop of the trailer, wherein the second sensor and the third sensor are configured to be disposed on fenders on opposed sides of the trailer.

6. The system of claim 1, wherein the at least one sensor is configured to be coupled to the watercraft.

7. The system of claim 1, further comprising a wind sensor configured to generate wind data, and wherein the memory and computer program code are further configured to, with the one or more processors, determine a wind corrective adjustment applied to the instructions.

8. The system of claim 1, further comprising a water current sensor configured to generate water current data, and wherein the memory and computer program code are further configured to, with the one or more processors, determine a water current corrective adjustment applied to the instructions.

9. The system of claim 1, wherein the propulsion device comprises one of an inboard motor, an outboard motor, a trolling motor, or a thruster coupled to the watercraft.

10. The system of claim 1, wherein at least one sensor comprises one of a visual, optical, radiofrequency, or radar sensor.

11. The system of claim 1, wherein the memory and computer program code are further configured to, with the one or more processors, alert the user that the trailer is incorrectly positioned for receiving the watercraft.

12. A non-transitory computer-readable medium having stored thereon a plurality of computer-executable instructions which, when executed by a computer, cause a computer to:
receive an indication from a user to position a watercraft on a trailer, wherein the watercraft comprises at least one propulsion device for propelling the watercraft along a body of water;
receive, from at least one sensor, position data indicative of a location and orientation of the watercraft relative to the trailer;
employ a machine learning module configured to:
record data from multiple attempts of positioning the watercraft on the trailer; and
analyze the recorded data to identify patterns in user behavior and watercraft response;
determine, based on the position data and the machine learning module, instructions to provide to the user to position the watercraft onto the trailer, wherein the machine learning module continuously updates the instructions based on the analyzed data;
cause display of the instructions to the user so as to aid the user to position the watercraft onto the trailer.

13. The non-transitory computer-readable medium of claim 12, wherein the computer-executable instructions are configured to cause display of the instructions to indicate where to position at least one of the at least one sensor on the watercraft.

14. The non-transitory computer-readable medium of claim 12, wherein the computer-executable instructions further cause the computer to determine instructions to provide to the user so that the user can operate the at least one propulsion device to maintain the watercraft within a predetermined distance of a bow stop of the trailer.

15. The non-transitory computer-readable medium of claim 12, wherein the computer-executable instructions further cause the generation of an alert to the user that the trailer is incorrectly positioned for receiving the watercraft.

16. A method for operating a propulsion device of a watercraft, the method comprising:
receiving an indication from a user to position the watercraft on a trailer;
generating, via one or more sensors, position data indicative of a location and orientation of the watercraft relative to the trailer;
employing a machine learning module configured to:
record data from multiple attempts of positioning the watercraft on the trailer; and
analyze the recorded data to identify patterns in user behavior and watercraft response;
determining, based on the position data and the machine learning module, instructions to provide to the user to position the watercraft onto the trailer, wherein the machine learning module continuously updates the instructions based on the analyzed data;
causing display of the instructions to the user so as to aid the user to position the watercraft onto the trailer.

17. The method of claim 16 further comprising causing generation of an alert to the user that the trailer is incorrectly positioned for receiving the watercraft.

* * * * *